United States Patent
Chiam et al.

(10) Patent No.: US 8,462,400 B2
(45) Date of Patent: Jun. 11, 2013

(54) IMAGE-READING APPARATUS, IMAGE-READING METHOD AND PROGRAM

(75) Inventors: Teck Wei Chiam, Singapore (SG); Chee Seng Ng, Singapore (SG)

(73) Assignee: Seiko Epson Corporation, Tokyo (JP)

( * ) Notice: Subject to any disclaimer, the term of this patent is extended or adjusted under 35 U.S.C. 154(b) by 435 days.

(21) Appl. No.: 12/757,877

(22) Filed: Apr. 9, 2010

(65) Prior Publication Data

US 2010/0259800 A1    Oct. 14, 2010

(30) Foreign Application Priority Data

Apr. 10, 2009    (JP) ................................. 2009-095750

(51) Int. Cl.
*H04N 1/04* (2006.01)

(52) U.S. Cl.
USPC ........... 358/475; 358/474; 358/520; 382/274; 382/275

(58) Field of Classification Search
USPC ................. 358/474, 475, 509, 497, 496, 501, 358/505, 513, 514, 520; 382/274, 275, 254, 382/167
See application file for complete search history.

(56) References Cited

U.S. PATENT DOCUMENTS

| | | | |
|---|---|---|---|
| 5,608,547 A | | 3/1997 | Nakatani et al. |
| 5,793,031 A | * | 8/1998 | Tani et al. ................. 235/462.15 |
| 6,084,692 A | * | 7/2000 | Ohtani et al. ................. 358/509 |
| 6,233,065 B1 | * | 5/2001 | Lee ................................ 358/475 |
| 7,006,260 B2 | * | 2/2006 | Sato et al. ..................... 358/448 |
| 7,248,378 B2 | * | 7/2007 | Shiraishi ...................... 358/1.13 |
| 7,659,532 B2 | * | 2/2010 | Kikuchi ......................... 250/566 |
| 7,663,786 B2 | * | 2/2010 | Kim et al. ...................... 358/496 |
| 7,782,498 B2 | * | 8/2010 | Hoshi ............................ 358/474 |
| 7,804,627 B2 | * | 9/2010 | Horiguchi ..................... 358/488 |
| 7,843,610 B2 | * | 11/2010 | Hoshi ............................ 358/474 |
| 7,864,383 B2 | * | 1/2011 | Shiraishi ...................... 358/474 |
| 8,184,345 B2 | * | 5/2012 | Inage ............................ 358/448 |
| 2003/0011693 A1 | * | 1/2003 | Oda ............................... 348/272 |
| 2006/0256398 A1 | * | 11/2006 | Ishimaru et al. .............. 358/461 |
| 2008/0285098 A1 | | 11/2008 | Kubo et al. |

FOREIGN PATENT DOCUMENTS

| | | |
|---|---|---|
| CN | 101309339 A | 11/2008 |
| CN | 101311706 A | 11/2008 |
| JP | 06-311307 A | 11/1994 |
| JP | 09-233261 A | 9/1997 |
| JP | 2003-152968 A | 5/2003 |
| JP | 2004-328154 A | 11/2004 |
| JP | 2006-253962 A | 9/2006 |
| JP | 2007-288580 A | 11/2007 |
| JP | 2009-027467 A | 2/2009 |

* cited by examiner

*Primary Examiner* — Negussie Worku (74) *Attorney, Agent, or Firm* — Kilpatrick Townsend & Stockton LLP (57) ABSTRACT

An image-reading apparatus that optically reads an original, includes: an illuminating section that illuminates the original with light; an imaging unit that creates pixel data on the basis of reflected light reflected from the original; a moving unit that moves the illuminating section and the imaging unit relative to the original in steps of a fixed distance in a scanning direction that points from one end of the original toward another end of the original; an illumination mode controller that, for each unit step of movement out of one entire scanning movement in the scanning direction performed by the moving unit, controls the illuminating section so that the illuminating section is made to operate in each of a plurality of illumination modes.

6 Claims, 7 Drawing Sheets

IMAGE-READING APPARATUS, IMAGE-READING METHOD AND PROGRAM

This application claims priority to Japanese Patent Application No. 2009-095750, filed Apr. 10, 2009, the entirety of which is incorporated by reference herein.

BACKGROUND

1. Technical Field

The present invention relates to an image-reading apparatus (image scanner) that optically reads an original.

2. Related Art

A known image-reading apparatus illuminates an original with light from a single direction by forming a line-shaped light emission region, reads the light reflected from the original, and thereby creates image data that represents the optically read original (refer to JP-A-2009-27467). In such an image-reading apparatus, the original is illuminated with light from a single direction and therefore blurring of an image caused by light scattered by the surface of the original (flare) can be suppressed and the original can be clearly read.

However, there has been a problem with the known image-reading apparatus, in that since an original can be clearly read, in the case where an original which is creased or has unevenness in the surface thereof is read, the undesired creases and unevenness of the original are also read. Accordingly, when using the known image-reading apparatus, an original has been read while using various illumination modes on a trial-and-error basis in order to determine the illumination mode best suited to the surface shape thereof.

SUMMARY

Some aspects of the invention are advantageous in that a technology is provided that enables the surface shape of an original to be read in a desired manner.

Embodiments of the invention can be implemented in the forms described hereafter.

According to a first aspect of the invention, an image-reading apparatus that optically reads an original, includes: an illuminating section that illuminates the original with light; an imaging unit that creates pixel data on the basis of reflected light reflected from the original; a moving unit that moves the illuminating section and the imaging unit relative to the original in steps of a fixed distance in a scanning direction that points from one end of the original toward another end of the original; an illumination mode controller that, for each unit step of movement out of one entire scanning movement in the scanning direction performed by the moving unit, controls the illuminating section so that the illuminating section is made to operate in each of a plurality of illumination modes; and an image-creating unit that, on the basis of pixel data created by the imaging unit while the illuminating unit is controlled to operate in each of the plurality of illumination modes by the illumination mode controller, creates a plurality of pieces of image data that respectively correspond to the plurality of illumination modes and represent the original. With the image-reading apparatus according to the first aspect of the invention, a plurality of pieces of image data respectively corresponding to the plurality of illumination modes can be obtained in the one entire scanning movement performed in the scanning direction and the desired illumination mode and image data can be easily determined by comparing the plurality of pieces of image data. As a result, the surface shape of the original can be read in a desired manner.

The image-reading apparatus according to the first aspect of the invention preferably further includes a three-dimensionality-determining unit that determines whether the original has a three-dimensional shape by comparing the plurality of pieces of image data created by the image-creating unit. With this image-reading apparatus, it can be easily determined whether the original has a three-dimensional shape, and then the original can be read and the read image can be subjected to image processing in accordance with whether or not the original has a three-dimensional shape.

In the image-reading apparatus according to the first aspect of the invention, the image-creating unit preferably includes a first obtaining unit that obtains from the imaging unit, after each unit step of movement, pixel data created by the imaging unit while the illuminating section operated in the first illumination mode out of the plurality of illumination modes, and a second obtaining unit that obtains from the imaging unit, after the one entire scanning movement performed by the moving unit in the scanning direction has finished, pixel data created by the imaging unit while the illuminating section operated in the second illumination mode, which differs from the first illumination mode, among the plurality of illumination modes. With this image-reading apparatus, image data corresponding to the first illumination mode can be created in parallel with movement in the scanning direction and therefore the speed of processing from initiation of movement in the scanning direction until completion of creation of image data can be improved.

In the image-reading apparatus according to the first aspect of the invention, the illuminating section preferably includes first and second illuminating units that each form a line-shaped light-emission region and illuminate the original with light from different directions that intersect each other and the plurality of illumination modes that the illuminating section is controlled to operate in by the illumination mode controller preferably include at least two of a first illumination mode in which the first illuminating unit is turned on and the second illuminating unit is turned off, a second illumination mode in which the first illuminating unit is turned off and the second illuminating unit is turned on, and a third illumination mode in which the original is illuminated by both the first and second illuminating units. With this image-reading apparatus, a plurality of pieces of image data respectively corresponding to the different illumination modes realized by the two illuminating devices can be obtained during one entire scanning movement performed in the scanning direction.

According to a second aspect of the invention, a program for causing a computer to realize a function of optically reading an original is provided, the program causing the computer to realize: an illumination control function in which the computer controls an illuminating device that illuminates the original with light; an imaging control function in which the computer controls an imaging device that creates pixel data on the basis of reflected light reflected from the original; and a movement control function in which the computer controls a moving device that moves the illuminating device and the imaging device relative to the original in steps of a fixed distance in a scanning direction that points from one end of the original toward another end of the original. Here, the illumination control function includes an illumination mode control function in which the computer controls the illuminating device so that, for each unit step of movement out of one entire scanning movement performed by the moving unit in the scanning direction, the illuminating device is made to operate in each of a plurality of illumination modes, and the imaging control function includes an image creation function in which the computer creates, on the basis of the pixel data created by imaging device while the illuminating unit is controlled to operate in each of the plurality of illumination modes by the illumination mode control function, a plurality of pieces of image data that respectively correspond to the plurality of illumination modes and represent the original. With the program according to the second aspect of the invention, a plurality of pieces of image data respectively corresponding to the plurality of illumination modes can be obtained in the one entire scanning movement performed in the scanning direction and the desired illumination mode and image data can be easily determined by comparing the plurality of pieces of image data.

According to a third aspect of the invention, an image-reading method for optically reading an original, includes: performing illumination control to control an illuminating device that illuminates the original with light; performing imaging control to control an imaging device that creates pixel data on the basis of reflected light reflected from the original; and performing movement control to control a moving device that moves the illuminating device and the imaging device relative to the original in steps of a fixed distance in a scanning direction that points from one end of the original toward another end of the original. Here, the illumination control includes illumination mode control to control the illuminating device so that, for each unit step of movement out of one entire scanning movement in the scanning direction performed by the moving device, the illuminating device is made to operate in each of a plurality of illumination modes, and the imaging control includes image creation to, on the basis of the pixel data created by the imaging device while the illuminating device is controlled to operate in each of the plurality of illumination modes by the illumination mode control, create a plurality of pieces of image data that respectively correspond to the plurality of illumination modes and represent the original. With the image-reading method according to the third aspect of the invention, a plurality of pieces of image data respectively corresponding to the plurality of illumination modes can be obtained in the one entire scanning movement performed in the scanning direction and the desired illumination mode and image data can be easily determined by comparing the plurality of pieces of image data.

Aspects of the invention are not limited to an image-reading apparatus, a program and an image-reading method and can be applied in the form of other embodiments. Furthermore, aspects of the invention are in no way limited to those described above and can be implemented in a variety of forms within the scope of the appended claims so long as they do not depart from the gist of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

In order to further clarify the configurations and operations of the above-described aspects of the invention, an image-reading system to which an embodiment of the invention has been applied will be described below.

A. Embodiment

A1. Configuration of Image-Reading System

Figure 1:
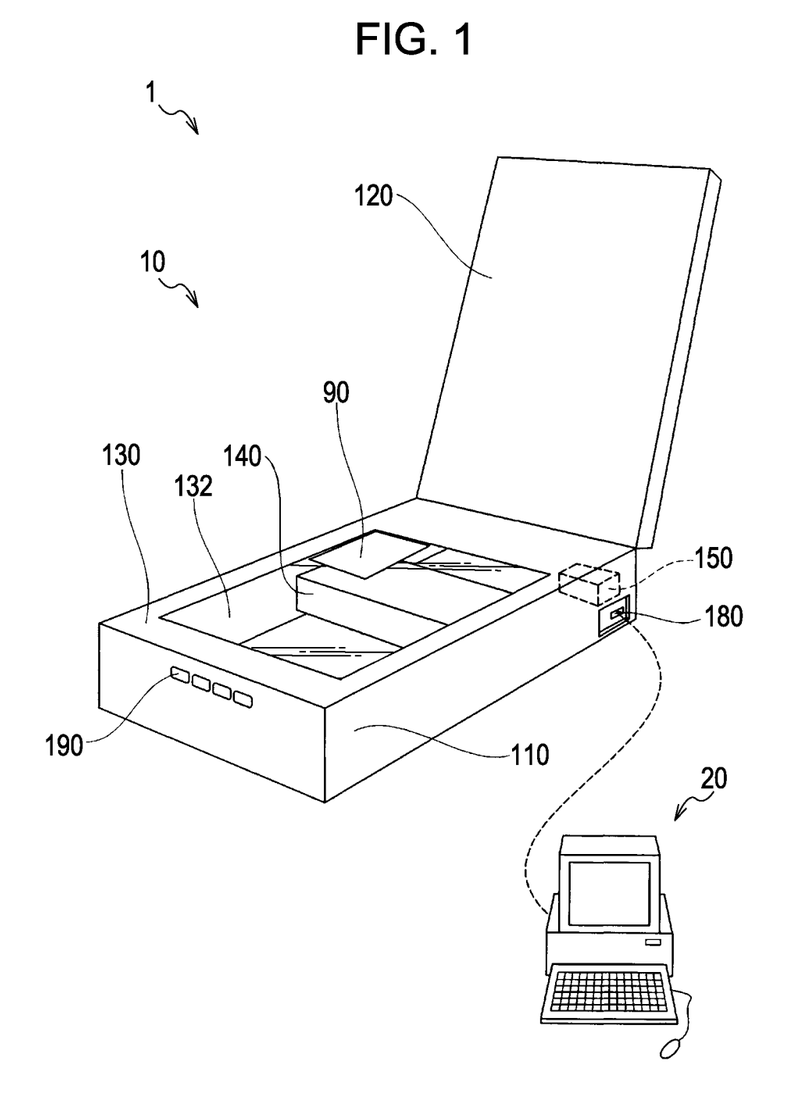
FIG. 1 is an explanatory view illustrating the external configuration of an image-reading system.

FIG. 1 is an explanatory view illustrating the external configuration of an image-reading system 1. The image-reading system 1 is a system that creates image data on the basis of an original 90. The image-reading system 1 includes an image scanner 10 and a personal computer 20.

The image scanner 10 of the image-reading system 1 is a flatbed image-reading apparatus and creates image data by optically reading an original. The image scanner 10 includes a main case 110, a lid 120, an original holder 130, an image-reading unit 140, a main control unit 150, an appliance interface 180 and a user interface 190.

The main case 110 of the image scanner 10 houses the image-reading unit 140. In this embodiment, the main case 110 is a case having a cuboidal shape.

The original holder 130 of the image scanner 10 is provided in the main casing 110 and forms a flat surface on which an original 90 is placed. A transparent section 132, which is formed from a transparent material, is provided as part of the flat surface of the original holder 130. In this embodiment, the original holder 130 is provided at the upper surface of the main case 110 and the transparent section 132 of the original holder 130 is formed of a plate of colorless transparent glass having a rectangular shape and a size smaller than the upper surface of the main casing 110.

The lid 120 of the image scanner 10 is a lid that can be opened or closed in a vertical direction relative to the surface of the original holder 130 and is provided on the main case 110. In this embodiment, the lid 120 has a shape having dimensions larger than those of the transparent section 132 of the original holder 130 and is pivotably attached to the main case 110.

The image-reading unit 140 of the image scanner 10 scans and optically reads an original placed on the transparent section 132 of the original holder 130 and creates image data that represents the original. The configuration of the image-reading unit 140 will be described in detail below.

The appliance interface 180 of the image scanner 10 facilitates exchange of information between the image scanner 10 and the personal computer 20. In this embodiment, the appliance interface 180 is an interface that conforms to the universal serial bus (USB) standard, but in another embodiment the appliance interface 180 may be an interface that connects the image scanner 10 to the personal computer 20 through a network. In this embodiment, the personal computer 20 obtains image data created by the image scanner 10 through the appliance interface 180.

The user interface 190 of the image scanner 10 facilitates exchange of information between the image scanner 10 and the user using the image scanner 10. In this embodiment, the user interface 190 is equipped with operation buttons that receive operation inputs from the user, and in other embodiments the user interface 190 may be further equipped with a graphic display that displays various information to the user. In this embodiment, the personal computer 20 also functions as a user interface of the image scanner 10, replacing or supplementing the functions provided by the user interface 190, and facilitates exchange of information with the user using the image scanner 10.

Figure 2:
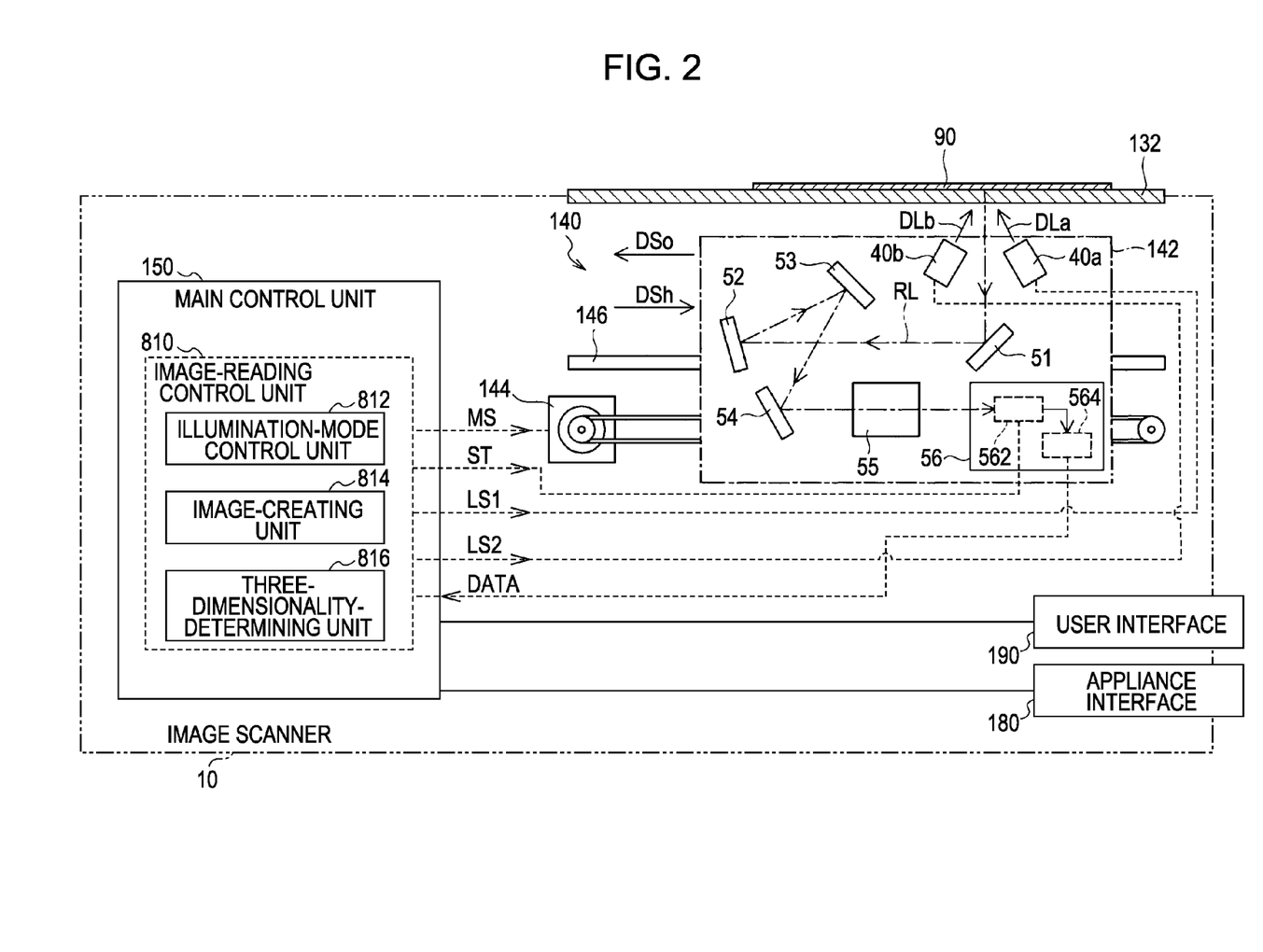
FIG. 2 is an explanatory view illustrating the configuration of an image scanner in detail.

FIG. 2 is an explanatory view illustrating the configuration of the image scanner 10 in detail. The image-reading unit 140 of the image scanner 10 is equipped with a carriage 142, a transporting mechanism 144 and a guide rod 146.

Various structural components that are used to optically read the original 90 are mounted on the carriage 142 of the image-reading unit 140 and the carriage 142 is capable of reciprocatively moving relative to the original 90 in an outward scanning direction DSo and in a return scanning direction DSh. The outward scanning direction DSo is a direction that points from one end of the transparent section 132 of the original holder 130 at which the carriage 142 stands by toward the other end of the transparent section 132 of the original holder 130 and the return scanning direction DSh is a direction that is opposite to the outward scanning direction DSo.

The guide rod 146 of the image-reading unit 140 is a rod that extends parallel to the scanning directions DSo and DSh and supports the carriage 142, which reciprocatively moves in the scanning directions DSo and DSh.

The transporting mechanism 144 of the image-reading unit 140 is a moving unit that moves the carriage 142 in the scanning directions DSo and DSh relative to the original 90 in steps of a fixed distance in accordance with an instruction from the main control unit 150. In this embodiment, the transporting mechanism 144 operates in accordance with a control signal MS output from the main control unit 150. In this embodiment, the transporting mechanism 144 is a belt-driving transporting mechanism and is equipped with for example a driving motor, a timing belt and a pulley.

The image-reading unit 140 is provided with illuminating devices 40a and 40b, reflectors 51, 52, 53 and 54, a lens unit 55 and an imaging apparatus 56 as the individual components mounted on the carriage 142.

The illuminating devices 40a and 40b of the image-reading unit 140 are first and second illuminating units that form line-shaped light emission regions and respectively illuminate the original 90 with light from directions DLa and DLb, which intersect each other, in accordance with an instruction from the main control unit 150. In this embodiment, the illuminating device 40a operates in accordance with a control signal LS1 output from the main control unit 150 and the illuminating device 40b operates in accordance with a control signal LS2 output from the main control unit 150. As illustrated in FIG. 2, the direction DLa of light radiated from the illuminating device 40a intersects the direction DLb of light radiated from the illuminating device 40b and light radiated from the illuminating device 40a and light radiated from the illuminating device 40b illuminate approximately the same position on the surface of the original 90 that is being read. In this embodiment, the longitudinal axis of the line-shaped light emission region formed by the illuminating devices 40a and 40b is parallel to the surface on which the original 90 is placed in the transparent section 132 of the original holder 130 and extends in a direction that intersects the scanning directions DSo and DSh.

Figure 3:
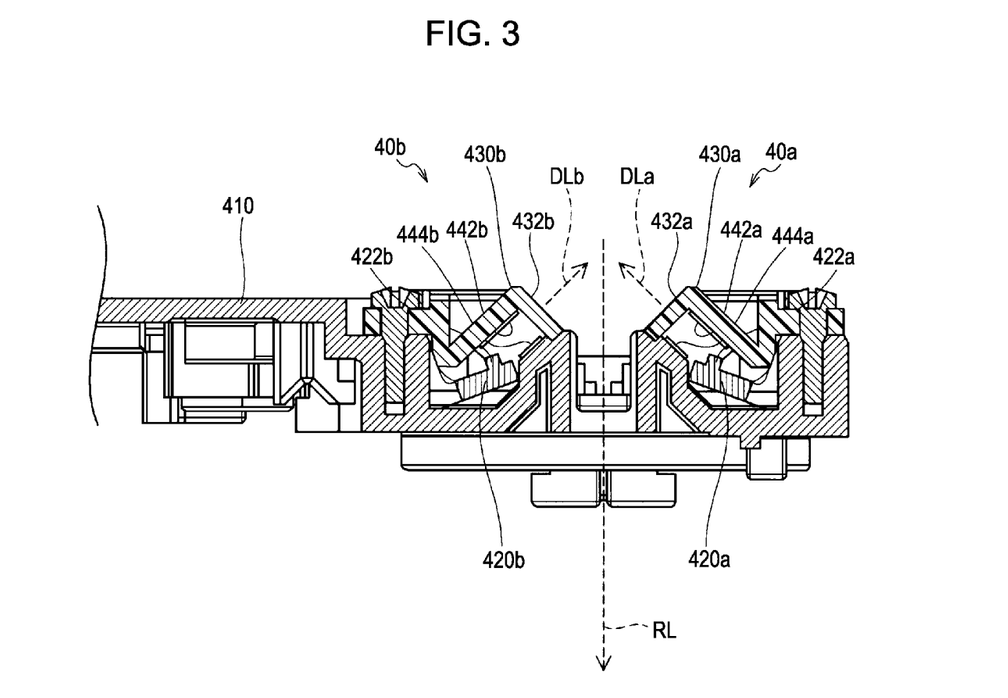
FIG. 3 is a partial sectional view illustrating the configuration of an illuminating apparatus in detail.
Figure 4:
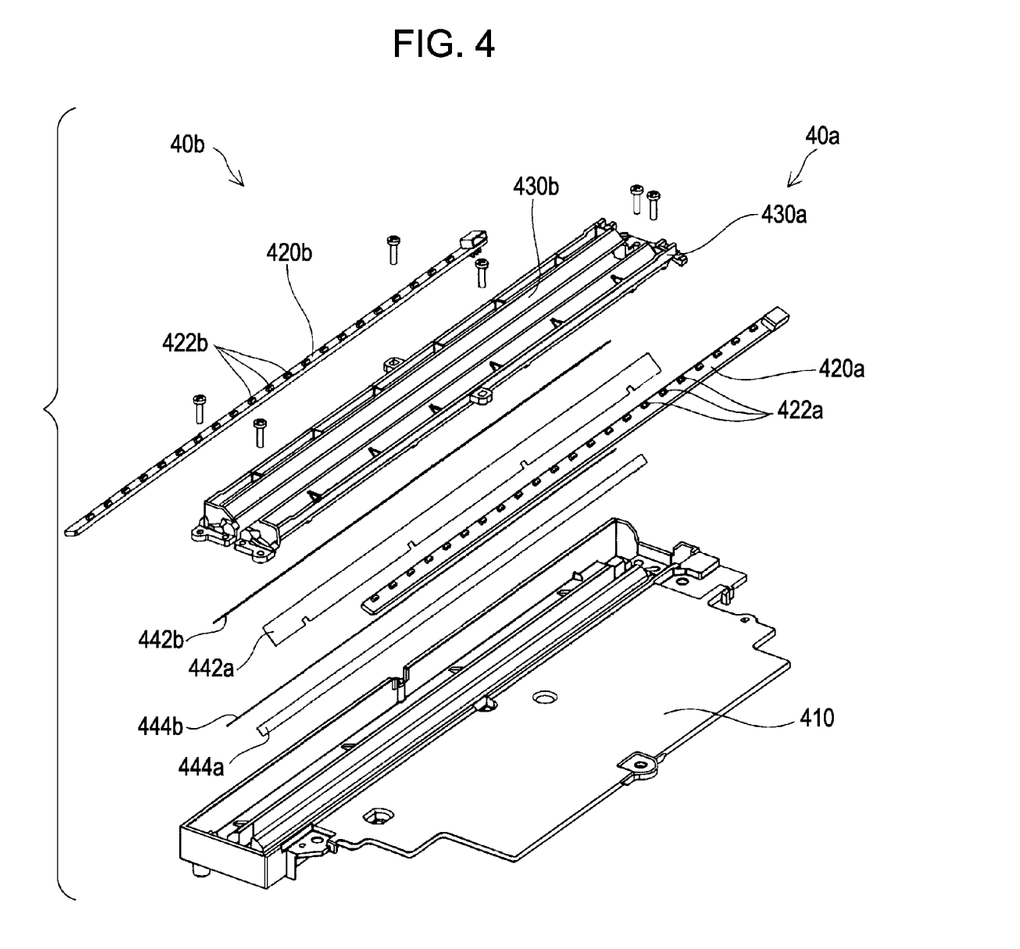
FIG. 4 is an exploded perspective view illustrating the configuration of the illuminating apparatus in detail.

FIG. 3 is a partial sectional view illustrating the configurations of the illuminating devices 40a and 40b in detail. FIG. 4 is an exploded perspective view illustrating the configurations of the illuminating devices 40a and 40b in detail. The illuminating devices 40a and 40b are installed in an illuminating device frame 410 that constitutes part of the carriage 142. The illuminating device 40a is equipped with a light-emitting board 420a, a diffuser 430a and reflectors 442a and 444a.

The light-emitting board 420a of the illuminating device 40a is a long printed circuit board on which a plurality of light-emitting devices 422a have been mounted in a line. In this embodiment, the light-emitting devices 422a are light-emitting diodes (LEDs) that emit white light, but in other embodiments other types of light source may be used. In this embodiment, twenty of the light-emitting devices 422a are mounted on the light-emitting board 420a in a single line, but in other embodiments the number of light-emitting devices 422a may be changed and the light-emitting devices 422a may be mounted in two or more lines.

The diffuser 430a of the illuminating device 40a is formed in a long shape from transparent or translucent-white synthetic resin and is a light-diffusing member that, after diffusing light emitted from the plurality of light-emitting devices 422a mounted on the light-emitting board 420a, outputs the light toward the original 90. The diffuser 430a includes a long narrow surface 432a that extends parallel to the line of the plurality of light-emitting devices 422a and forms a line-shaped light emission region by emitting light from the long narrow surface 432a.

The reflectors 442a and 444a of the illuminating device 40a are light-reflecting members that reflect light emitted from the light-emitting devices 422a of the light-emitting board 420a toward the long narrow surface 432a of the diffuser 430a. In this embodiment, the reflectors 442a and 444a are formed of a synthetic resin that has been subjected to metal-plating, but in other embodiments may be metal plates or mirrors.

As illustrated in FIG. 3, the configuration of the illuminating device 40b is the same as that of the illuminating device 40a, except for the fact that the configuration of the illuminating device 40b is axisymmetrical with the configuration of the illuminating device 40a. In this specification and in the drawings, the "a" appended to reference symbols of individual components included in the illuminating device 40a is replaced with "b" in the reference symbols of corresponding respective components of the illuminating device 40b.

Returning to the description of FIG. 2, the reflectors 51, 52, 53 and 54 of the image-reading unit 140 reflect light reflected from the original 90 toward the lens unit 55. The lens unit 55 of the image-reading unit 140 is equipped with a plurality of lenses arranged in a line and causes light reflected from the reflector 54 to be focused onto the imaging apparatus 56. In this embodiment, a path RL of reflected light, which extends to the imaging apparatus 56 from the original 90, passes between the illuminating devices 40a and 40b, then through the reflectors 51, 52, 53 and 54 in this order, before finally reaching the lens unit 55.

The imaging apparatus 56 of the image-reading unit 140 creates pixel data based on reflected light focused by the lens unit 55 in accordance with a control signal ST output from the main control unit 150. The imaging apparatus 56 is equipped with imaging devices 562 and an imaging buffer 564. The imaging devices 562 of the imaging apparatus 56 convert reflected light focused by the lens unit 55 into electrical signals. In this embodiment, the imaging devices 562 are provided so as to correspond to the illuminating devices 40a and 40b and are a plurality of charge coupled devices (CCDs) arranged in a line, but in other embodiments may be other imaging devices such as complementary metal oxide semiconductor (CMOS) devices. The imaging buffer 564 of the imaging apparatus 56 is a storage device that temporally stores electrical signals created by the imaging devices 562 converting the light incident thereon into electricity. In this embodiment, pixel data accumulated in the imaging buffer 564 is output to the main control unit 150 as a data signal DATA.

The main control unit 150 of the image scanner 10 is electrically connected to the individual components of the image scanner 10 such as the image-reading unit 140, the appliance interface 180 and the user interface 190 and, in this embodiment, is capable of communicating with the personal computer 20 via the appliance interface 180 and performs various control processing operations in accordance with instructions from the personal computer 20.

The main control unit 150 is equipped with an image-reading control unit 810 that controls each component of the image scanner 10. More specifically, the image-reading control unit 810 performs for example a lighting control operation that controls turning on and off of the illuminating devices 40a and 40b, imaging control, a transporting control operation that controls driving of the transporting mechanism 144 and an imaging control operation that performs control of an imaging operation of the imaging apparatus 56. In this embodiment, the functions of the image-reading control unit 810 of the main control unit 150 are implemented by having a central processing unit (CPU) operate in accordance with a program, but in other embodiments may be implemented by having an electronic circuit of the main control unit 150 operate in accordance with the physical circuit structure of the main control unit 150.

The image-reading control unit 810 of the main control unit 150 is equipped with an illumination-mode control unit 812, an image-creating unit 814 and a three-dimensionality-determining unit 816. The illumination-mode control unit 812 of the image-reading control unit 810 performs control so that the illuminating devices 40a and 40b are made to operate in each of a plurality of illumination modes for each unit step of movement out of one entire scanning movement in the outward scanning direction DSo performed by the transporting mechanism 144. The image-creating unit 814 of the image-reading control unit 810 creates, on the basis of the pixel data created by the imaging apparatus 56 while the illuminating devices 40a and 40b were controlled to operate in each of the plurality of illumination modes by the illumination-mode control unit 812, a plurality of pieces of image data that respectively correspond to the plurality of illumination modes and represent the original 90. The three-dimensionality-determining unit 816 of the image-reading control unit 810 determines whether the original 90 has a three-dimensional shape by comparing the plurality of pieces of image data created by the image-creating unit 814.

In this embodiment, when the original 90 is read in the image scanner 10, the main control unit 150 performs a first scanning operation in the outward scanning direction DSo and then performs a second scanning operation in the return scanning direction DSh. In the first scanning operation, the main control unit 150 creates a plurality of pieces of image data, which respectively correspond to the plurality of illumination modes, by using functions implemented by the illumination-mode control unit 812 and the image-creating unit 814, and then determines whether the original 90 has a three-dimensional shape by using the function implemented by the three-dimensionality-determining unit 816. Next, in the second scanning operation, the main control unit 150 creates image data representing the read original 90 with consideration of whether or not the original 90 was determined to have a three-dimensional shape. After that, the main control unit 150 transfers the image data to the personal computer 20 through the appliance interface 180.

A2. Operation of Image-Reading System

Figure 5:
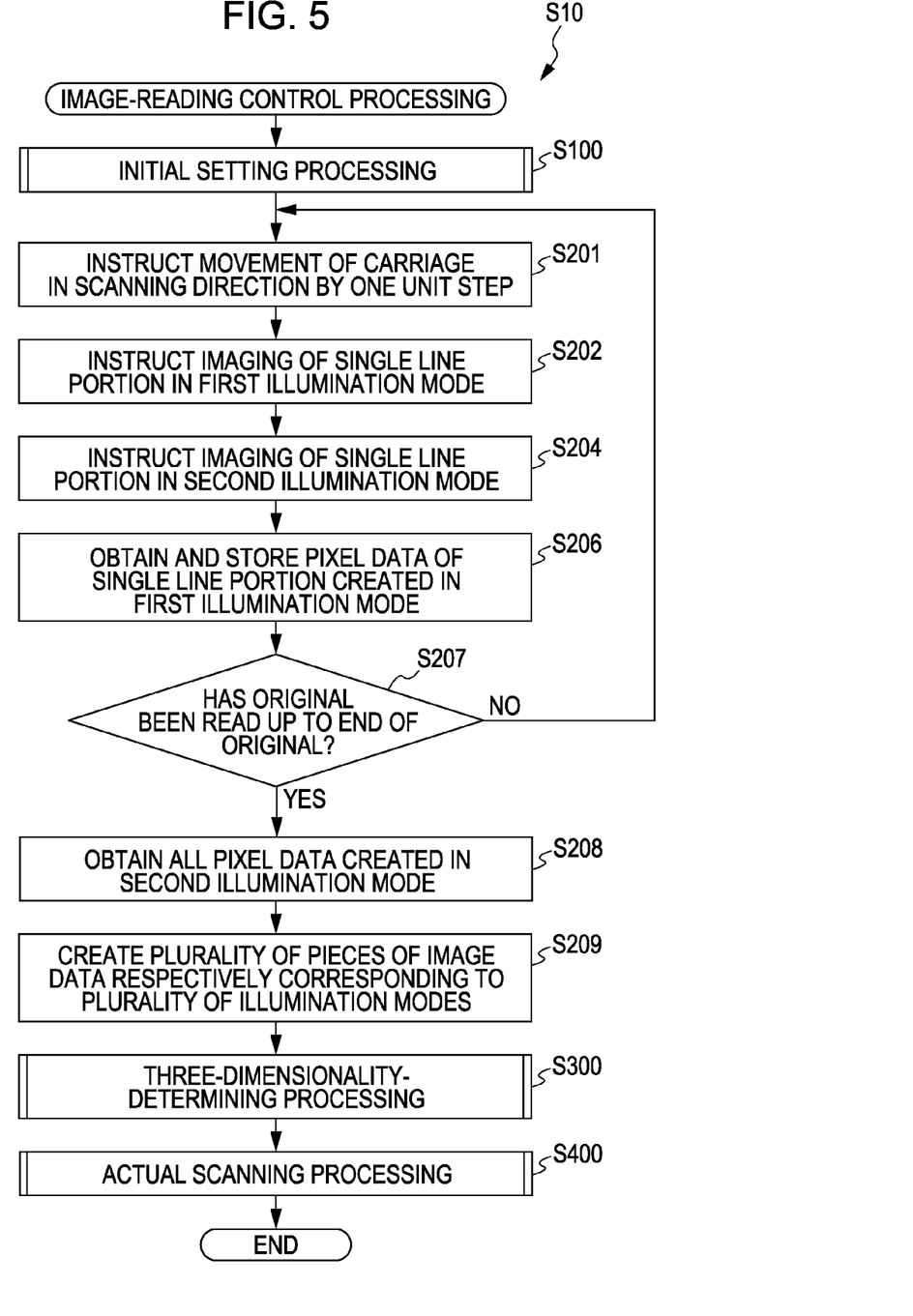
FIG. 5 is a flowchart illustrating image-reading control processing performed by a main control unit of the image scanner.

FIG. 5 is a flowchart illustrating image-reading control processing (step S10) performed by the main control unit 150 of the image scanner 10. The image-reading control processing (step S10) is processing implemented by the image-reading control unit 810 of the main control unit 150. In this embodiment, first, the user positions the original 90 on the original holder 130 of the image scanner 10 and then the main control unit 150 initiates the image-reading control processing (step S10) in accordance with an input instruction, which has been input through the user interface 190 of the image scanner 10.

When the image-reading control processing (step S10) is initiated, the main control unit 150 of the image scanner 10 performs initial setting processing (step S100). In the initial setting processing (step S100), the main control unit 150 adjusts settings of the illuminating devices 40a and 40b and the imaging apparatus 56. In this embodiment, the main control unit 150 adjusts the amount of and the emission distribution of light to be emitted from the illuminating devices 40a and 40b and adjusts the black level of the output of the imaging devices 562 in the imaging apparatus 56.

After the initial setting processing (step S100), the main control unit 150 instructs the transporting mechanism 144 to move the carriage 142 in the outward scanning direction DSo by a unit step (step S201). In this embodiment, the main control unit 150 uses a control signal MS to control the transporting mechanism 144.

After the transporting mechanism 144 has been instructed to move the carriage 142 (step 5201), the main control unit 150 performs control so that the illuminating devices 40a and 40b are made to operate in a first illumination mode and instructs the imaging apparatus 56 to perform imaging of one line portion while the illuminating devices 40a and 40b are operating in the first illumination mode (step S202). In this embodiment, the main control unit 150 uses control signals LS1 and LS2 to respectively control the illuminating devices 40a and 40b and uses a control signal ST to control the imaging apparatus 56. In this embodiment, the first illumination mode is an illumination mode in which the illuminating device 40a is turned on and the illuminating device 40b is turned off. In this embodiment, the pixel data of the one line portion created while the illuminating devices 40a and 40b are operating in the first illumination mode is temporarily stored in the imaging buffer 564.

After instruction of imaging in the first illumination mode (step S202), the main control unit 150 performs control so that the illuminating devices 40a and 40b are made to operate in the second illumination mode and instructs the imaging apparatus 56 to perform imaging of one line portion while the illuminating devices 40a and 40b are operating in the second illumination mode (step S204). In this embodiment, the main control unit 150 uses control signals LS1 and LS2 to respectively control the illuminating devices 40a and 40b and uses a control signal ST to control the illuminating apparatus 56. In this embodiment, the second illumination mode is an illumination mode in which the illuminating device 40a is turned off and the illuminating device 40b is turned on. In this embodiment, the pixel data of the one line portion created while the illuminating devices 40a and 40b are operating in the second illumination mode is temporarily stored in the imaging buffer 564.

After instruction of imaging in the second illumination mode (step S204), the main control unit 150 obtains the pixel data of the one line portion imaged in the first illumination mode from the imaging buffer 564 and stores the pixel data as image data corresponding to the first illumination mode (step S206). In this embodiment, the main control unit 150, obtains the pixel data of the one line portion imaged in the first illumination mode from the imaging buffer 564 in the form of a data signal DATA.

After obtainment of the pixel data, which was created by performing imaging in the first illumination mode (S206), the main control unit 150 repeatedly performs (NO in step S207) the processing from instruction of the transporting mechanism 144 to move the carriage 142 (step 5201) onward until reading of the original 90 up to the end of the original 90 is complete.

After reading of the original 90 up to the end of the original 90 is complete (YES in step S207), the main control unit 150 obtains the pixel data of all of the line portions imaged in the second illumination mode from the imaging buffer 564 (step S208). In this embodiment, the main control unit 150 obtains the pixel data of all of the line portions imaged in the second illumination mode from the imaging buffer 564 in the form of a data signal DATA.

Figure 6:
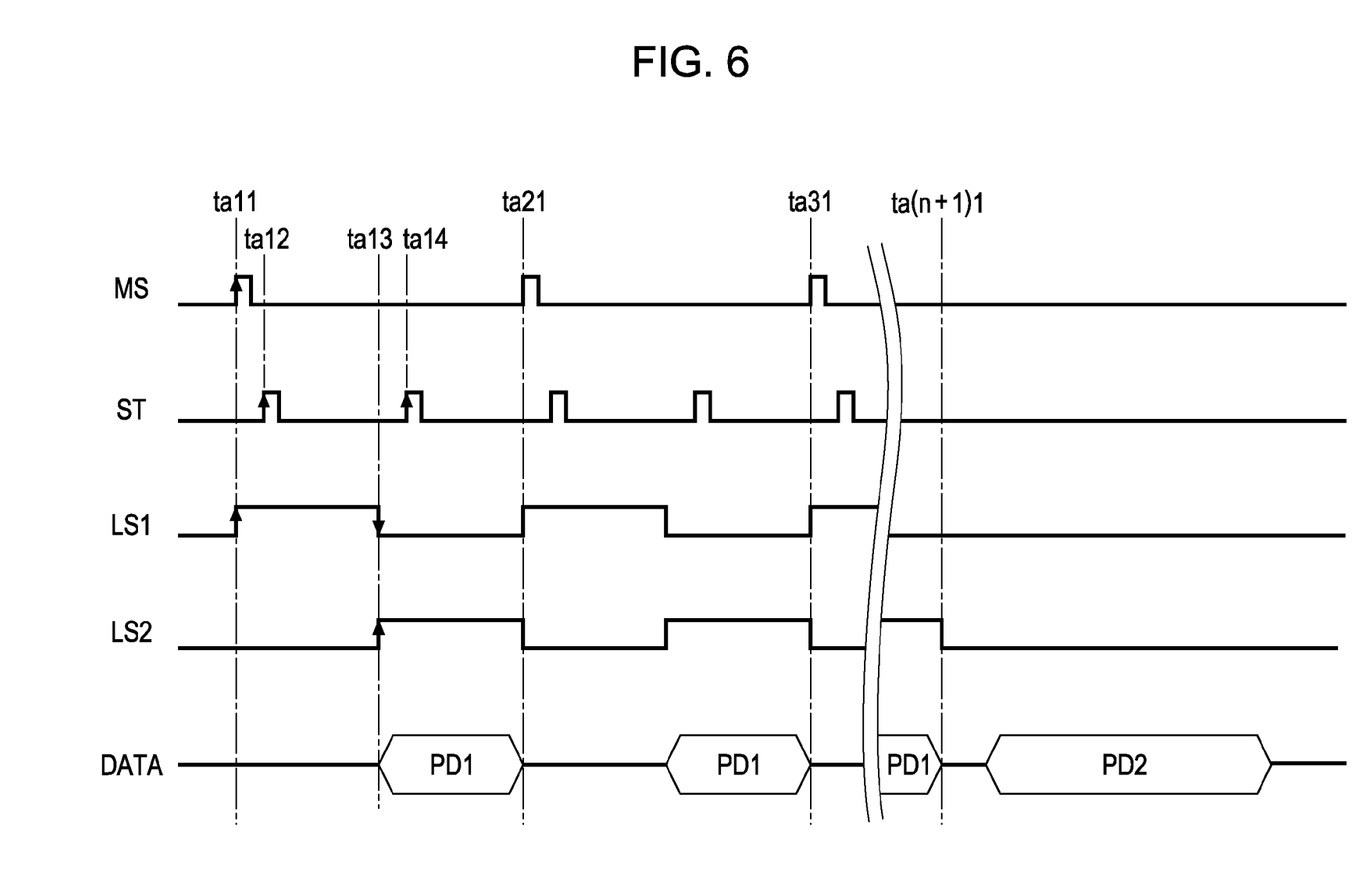
FIG. 6 is a timing chart illustrating examples of control signals and a data signal output from the main control unit.

FIG. 6 is a timing chart illustrating examples of the control signals MS, ST, LS1 and LS2 and the data signal DATA output from the main control unit 150. The image-reading control processing (step S10) begins and, after the initial setting processing (step S100), the main control unit 150 instructs the transporting mechanism 144 to move the carriage 142 (step S201) by temporarily raising the level of the control signal MS from a low level ("0" in a binary signal) to a high level ("1" in a binary signal) (at a timing ta11)). In response to this raising of the level of the control signal MS, the transporting mechanism 144 moves the carriage 142 in the outward scanning direction DSo by one unit step.

Synchronously with raising of the level of the control signal MS, the main control unit 150 instructs imaging to be performed in the first illumination mode (S202) by holding the control signal LS1 at the high level and the control signal LS2 at the low level (at a timing ta11) and then temporarily raising the control signal ST to the high level (at a timing ta12). The illuminating device 40a is turned on throughout the period when the control signal LS1 is at the high level and the illuminating device 40b is turned off throughout the period when the control signal LS2 is at the low level. Furthermore, in response to the raising of the level of the control signal ST, the imaging apparatus 56 performs imaging of one line portion. In this way, imaging of one line portion in the first illumination mode, in which the illuminating device 40a is turned on and the illuminating device 40b is turned off, is realized.

Once imaging in the first illumination mode is complete, the main control unit 150 instructs imaging in the second illumination mode (step S204) by holding the control signal LS1 at the low level and the control signal LS2 at the high level (at timing ta13) and then temporarily raising the control signal ST to the high level (at timing ta14). The illuminating device 40a is turned off throughout the period when the control signal LS1 is at the low level and the illuminating device 40b is turned on throughout the period when the control signal LS2 is at the high level. In response to the raising of the level of the control signal ST, the imaging apparatus 56 performs imaging of one line portion. In this way, imaging of one line portion in the second illumination mode, in which the illuminating device 40a is turned off and the illuminating device 40b is turned on, is realized.

When imaging in the first illumination mode is complete, the main control unit 150 requests the imaging apparatus 56 to output thereto pixel data PD1 of the one line portion imaged immediately before in the first illumination mode (step S206) and the imaging apparatus 56 outputs to the main control unit 150 the pixel data PD1 of the one line portion imaged immediately before in the first illumination mode out of pixel data stored in the imaging buffer 564 of the imaging apparatus 56 as a data signal DATA (at timings ta13 to ta21).

Next, operations from the timing Ta11 are repeatedly performed until reading of the original 90 up to the end of the original 90 is complete (timing ta21 to timing ta(n+1)1). In the example illustrated in FIG. 6, n line portions (n being a natural number) are imaged in each of the first and second illumination modes.

After reading up to the end of the original 90 is complete (NO in step S207), the main control unit 150 requests the imaging apparatus 56 to output thereto pixel data PD2 of all of the line portions imaged in sequence in the second illumination mode (step S208) and the imaging apparatus 56 outputs to the main control unit 150, as a data signal DATA, the pixel data PD2 of all of the line portions imaged in sequence in the second illumination mode out of pixel data stored in the imaging buffer 564 of the imaging apparatus 56 (at timings ta(n+1)1).

Returning to description of FIG. 5, after pixel data obtained by performing imaging in the second illumination mode has been obtained (step S209), the main control unit 150 creates a plurality of pieces of image data that respectively correspond to the first and second illumination modes (step S209). In this embodiment, the main control unit 150 creates the image data corresponding to the first illumination mode by arranging all the pieces of pixel data of the line portions imaged in the first illumination mode in the order in which they were obtained by imaging and the main control unit 150 creates the image data corresponding to the second illumination mode by arranging all the pieces of pixel data of the line portions imaged in the second illumination mode in the order in which they were acquired by imaging.

After the plurality of pieces of image data respectively corresponding to the first and second illumination modes have been created (step S209), the main control unit 150 performs three-dimensionality-determining processing (step S300). In the three-dimensionality-determining processing (step S300), the main control unit 150 determines whether the original 90 has a three-dimensional shape by comparing the plurality of pieces of image data respectively corresponding to the first and second illumination modes. For example, in the three-dimensionality-determining processing (step S300), the main control unit 150 calculates the number of pixels for which a difference in pixel value at the same position within the original 90 exceeds a set threshold Th1, and in the case where the calculated number of pixels exceeds a second threshold Th2, it may be determined that the original 90 is an object having a three-dimensional shape (for example, a book or a photo album). Furthermore, in the three-dimensionality-determining processing (step S300), the main control unit 150 may recognize the existence of unevenness in forms such as creases in, the three-dimensionality of, tears in, particulates on or dirt on the original 90.

After the three-dimensionality-determining processing (step S300), the main control unit 150 performs actual scanning processing (step S400). In the actual scanning processing (step S400), the main control unit 150 causes the carriage 142 to move in the return scanning direction DSh and reads the original 90 in a manner that corresponds to the result of the three-dimensionality-determining processing (step S300). For example, in the case where the original 90 is determined to be a three-dimensional object in the three-dimensionality-determining processing (step S300), in the actual scanning processing (step S400), the main control unit 150 may reduce the occurrence of shadows projected onto the read image by reading the original 90 in an illumination mode in which both the illuminating devices 40a and 40b are turned on. Furthermore, in the case where the existence of unevenness in forms such as creases in, the three-dimensionality of, tears in, particulates on or dirt on the original 90 was recognized in the three-dimensionality-determining processing (step S300), in the actual scanning processing (step S400), the main control unit 150 may reduce the appearance of the unevenness of the original 90 projected onto the read image by reading the original 90 and then subjecting the read image of the original 90 to correction processing in accordance with the recognized unevenness.

A3. Advantage

With the above-described image scanner 10, a plurality of pieces of image data respectively corresponding to the first and second illumination modes can be obtained while moving the carriage 142 through one entire movement in the outward scanning direction DSo (step S209) and the desired illumination mode and image data can be easily determined by comparing the plurality of pieces of image data (step S300). As a result, the surface shape of the original 90 can be read in a desired manner (step S400).

In addition, since it can be determined whether the original 90 has a three-dimensional shape by comparing the plurality of pieces of image data respectively corresponding to the first and second illumination modes (step S300), whether the original 90 has a three-dimensional shape can be readily determined and the original 90 can be read and the read image of the original 90 can be subjected to image processing in accordance with whether it was determined that the original 90 has a three-dimensional shape (step S400).

Furthermore, since image data corresponding to the first illumination mode can be created while moving the carriage 142 in the outward scanning direction DSo (step S206), the speed at which processing is performed from starting to move the carriage in the outward scanning direction DSo (step S100) up to completion of creating of image data (step S209) can be improved.

B. Modifications

B1. First Modification

The configuration of the image-reading system 1 according to a first modification is the same as that of the above-described embodiment. Furthermore, the operation of the image-reading system 1 according to the first modification is the same as that of the above-described embodiment except for image-reading control processing performed by the main control unit 150 of the scanner 10.

Figure 7:
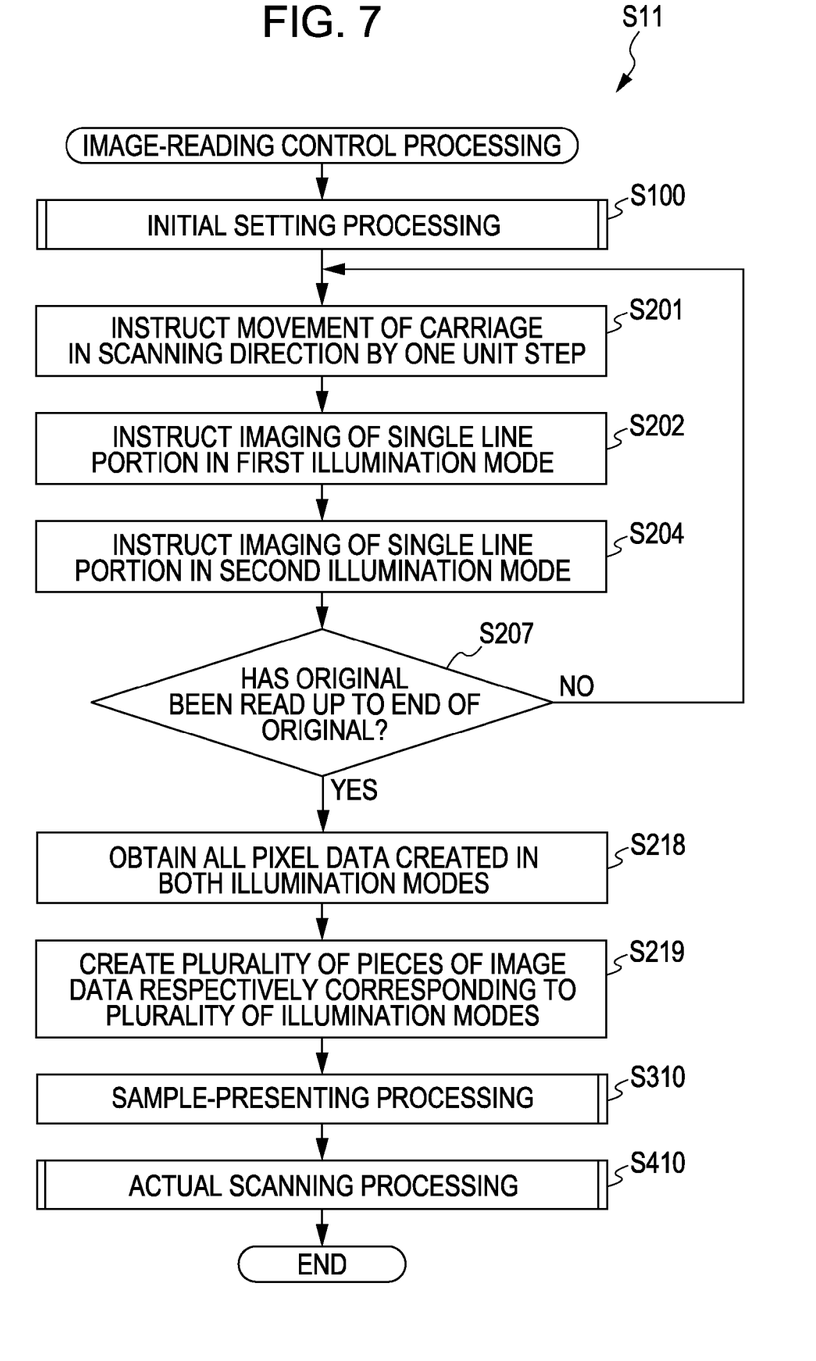
FIG. 7 is a flowchart illustrating image-reading control processing performed by the main control unit of the image scanner according to a first modification.

FIG. 7 is a flowchart illustrating image-reading control processing (step S11) performed by the main control unit 150 of the image scanner 10 in the first modification. The image-reading control processing (step S11) is implemented by the image-reading control unit 810 of the main control unit 150. In this modification, after the user has arranged the original 90 on the original holder 130 of the image scanner 10, the main control unit 150 initiates the image-reading control processing (step S11) in accordance with instructions input through the user interface 190 of the image scanner 10.

When the image-reading control processing (step S11) is initiated, the main control unit 150 of the image scanner 10 performs initial setting processing (step S100), similarly to as in the above-described embodiment.

After the initial setting processing (step S100), the main control unit 150 instructs the transporting mechanism 144 to move the carriage 142 in the outward scanning direction DSo by one unit step, similarly to as in the above-described embodiment (step S201).

After instructing the transporting mechanism 144 to move the carriage 142 (step S201), similarly to as in the above-described embodiment, the main control unit 150 performs control so that the illuminating devices 40a and 40b are made to operate in the first illumination mode and instructs the imaging apparatus 56 to perform imaging of one line portion in the first illumination mode (step S202).

After instruction of imaging in the first illumination mode (step S202), similarly to as in the above-described embodiment, the main control unit 150 performs control so that the illuminating devices 40a and 40b are made to operate in the second illumination mode and instructs the imaging apparatus 56 to perform imaging of one line portion in the second illumination mode (step S204).

After instruction of imaging in the second illumination mode (step S204), the main control unit 150 repeatedly performs (NO in step S207) the processing from instructing the driving mechanism 144 to move the carriage 142 (step S201) until reading of the original 90 up to the end of the original 90 is complete.

After reading of the original 90 up to the end of the original 90 is complete (YES in step S207), the main control unit 150 obtains pixel data of all of the line portions imaged in the first and second illumination modes from the imaging buffer 564 (step S218). In this modification, the main control unit 150 obtains the pixel data of all of the line portions imaged in the first and second illumination modes from the imaging buffer 564 in the form of a data signal DATA.

After the pixel data of the line portions imaged in the first and second illumination modes has been obtained_(step S219), the main control unit 150 creates a plurality of pieces of image data respectively corresponding to the first and second illumination modes (step S219), similarly to as in the above-described embodiment.

After creation of the plurality of pieces of image data respectively corresponding to the first and second illumination modes (step S219), the main control unit 150 performs sample-presenting processing (step S310). In the sample-presenting processing (step S310), the main control unit 150 presents images respectively corresponding to the first and second illumination modes to the user through the personal computer 20 and receives an input instruction selecting either the first illumination mode or the second illumination mode from the user.

After the sample-presenting processing (step S310), the main control unit 150 performs actual scanning processing (step S400). In the actual scanning processing (step S400), the main control unit 150 causes the carriage 142 to move in the return scanning direction DSh and reads the original 90 in the illumination mode selected by the user in the sample-presenting processing (step S310).

With the image scanner 10 according to the above-described first modification, a plurality of pieces of image data respectively corresponding to the first and second illumination modes can be obtained while the carriage 142 is moved through one entire scanning movement in the outward scanning direction DSo (step S219). By comparing the plurality of pieces of image data, a desired illumination mode and image data can be easily determined (step S310). As a result, the surface shape of the original 90 can be read in a desired manner (step S410).

B2. Second Modification

In the above-described embodiment and first modification, examples were described in which the original 90 is read in the first and second illumination modes while the carriage 142 is moved through one entire scanning movement in the outward scanning direction DSo. However, the original 90 may be read in different illumination modes while the carriage 142 is moved in the outward scanning direction DSo and may be read in three or more illumination modes while the carriage 142 is moved through one entire scanning movement in the outward scanning direction DSo. For example, the illumination modes may include at least two of a first illumination mode in which the illuminating device 40a is turned on and the illuminating device 40b is turned off, a second illumination mode in which the illuminating device 40a is turned off and the illuminating device 40b is turned on and a third illumination mode in which the original 90 is illuminated by both the first and second illuminating devices 40a and 40b, and an illumination mode in which the amount of light and the light-emission distribution of each of the illuminating devices 40a and 40b are individually varied. In the third illumination mode in which both of the illuminating devices 40a and 40b illuminate the original 90, the amount of light emitted by the illuminating device that is comparatively brighter due to individual differences between the illuminating devices 40a and 40b may be controlled so as to match the brightness of the illuminating device that is comparatively less bright.

With the image scanner 10 according to the above-described second modification, a plurality of pieces of image data respectively corresponding to different illumination modes realized by the two illuminating devices 40a and 40b can be obtained while the carriage 142 is moved through one entire scanning movement in the outward scanning direction DSo.

C. Other Embodiments

Embodiments of the invention are in no way limited to those described above and it goes without saying that embodiments of the invention can be implemented in a variety of forms within the scope of the appended claims so long as they do not depart from the gist of the invention.

For example, in the above-described embodiment, an example was described in which an embodiment of the invention was applied to the flat-bed image scanner 10. However, in other embodiments, an embodiment of the invention may be applied to automatic-original-feeding image scanners, portable image scanners and drum image scanners and in addition an embodiment of the invention can be applied to original-reading apparatuses such as facsimile machines, photocopiers and multifunction apparatuses.

Furthermore, in the above-described embodiment, the original 90 is read in a plurality of illumination modes while the carriage 142 is moved in the outward scanning direction DSo, but in other embodiments the original 90 may be read in a plurality of illumination modes while the carriage 90 is moved in the return scanning direction DSh or the original 90 may be read in a plurality of illumination modes while the carriage 142 is moved in both the outward scanning direction DSo and the return scanning direction DSh.

In addition, in the above-described embodiment, the carriage 142 is moved in the scanning directions DSo and DSh while the original 90 remains fixed in place, but the positional relationship between the original 90 and the carriage 142 only needs to be relative, and in other embodiments the original 90 may be moved in the scanning directions DSo and DSh while the carriage 142 remains fixed in place or both the original 90 and the carriage 142 may be moved in the scanning directions DSo and DSh.

What is claimed is:

1. An image-reading apparatus that optically reads an original, comprising:
an illuminating section that illuminates the original with light;
an imaging unit that creates pixel data on the basis of reflected light reflected from the original;
a moving unit that moves the illuminating section and the imaging unit relative to the original in steps of a fixed distance in a scanning direction that points from one end of the original toward another end of the original;
an illumination mode controller that, for each unit step of movement out of one entire scanning movement in the scanning direction performed by the moving unit, controls the illuminating section so that the illuminating section is made to operate in each of a plurality of illumination modes; and
an image-creating unit that, on the basis of pixel data created by the imaging unit while the illuminating unit is controlled to operate in each of the plurality of illumination modes by the illumination mode controller, creates a plurality of pieces of image data that respectively correspond to the plurality of illumination modes and represent the original.

2. The image-reading apparatus according to claim 1, further comprising:
a three-dimensionality-determining unit that determines whether the original has a three-dimensional shape by comparing the plurality of pieces of image data created by the image-creating unit.

3. The image-reading apparatus according to claim 1, wherein the image-creating unit includes a first obtaining unit that obtains from the imaging unit, after each unit step of movement, pixel data created by the imaging unit while the illuminating section operated in the first illumination mode out of the plurality of illumination modes, and a second obtaining unit that obtains from the imaging unit, after the one entire scanning movement performed by the moving unit in the scanning direction has finished, pixel data created by the imaging unit while the illuminating section operated in the second illumination mode, which differs from the first illumination mode, among the plurality of illumination modes.

4. The image-reading apparatus according to claim 1, wherein the illuminating section includes first and second illuminating units that each form a line-shaped light-emission region and illuminate the original with light from different directions that intersect each other, and
wherein the plurality of illumination modes that the illuminating section is controlled to operate in by the illumination mode controller include at least two of a first illumination mode in which the first illuminating unit is turned on and the second illuminating unit is turned off, a second illumination mode in which the first illuminating unit is turned off and the second illuminating unit is turned on, and a third illumination mode in which the original is illuminated by both the first and second illuminating units.

5. A non-transitory recording medium, storing thereon a program for causing a computer to realize a function of optically reading an original, the program causing the computer to realize:
an illumination control function in which the computer controls an illuminating device that illuminates the original with light;
an imaging control function in which the computer controls an imaging device that creates pixel data on the basis of reflected light reflected from the original; and
a movement control function in which the computer controls a moving device that moves the illuminating device and the imaging device relative to the original in steps of a fixed distance in a scanning direction that points from one end of the original toward another end of the original;

wherein, the illumination control function includes an illumination mode control function in which the computer controls the illuminating device so that, for each unit step of movement out of one entire scanning movement performed by the moving unit in the scanning direction, the illuminating device is made to operate in a plurality of illumination modes, and wherein the imaging control function includes an image creation function in which the computer creates, on the basis of the pixel data created by imaging device while the illuminating unit is controlled to operate in each of the plurality of illumination modes by the illumination mode control function, a plurality of pieces of image data that respectively correspond to the plurality of illumination modes and represent the original.

6. An image-reading method for optically reading an original, comprising:

performing illumination control to control an illuminating device that illuminates the original with light;

performing imaging control to control an imaging device that creates pixel data on the basis of reflected light reflected from the original; and performing movement control to control a moving device that moves the illuminating device and the imaging device relative to the original in steps of a fixed distance in a scanning direction that points from one end of the original toward another end of the original;

wherein the illumination control includes illumination mode control to control the illuminating device so that, for each unit step of movement out of one entire scanning movement performed by the moving device, the illuminating device is made to operate in each of a plurality of illumination modes, and wherein the imaging control includes image creation to, on the basis of the pixel data created by the imaging device while the illuminating unit is controlled to operate in each of the plurality of illumination modes by the illumination mode control, create a plurality of pieces of image data that respectively correspond to the plurality of illumination modes and represent the original.

* * * * *